(12) United States Patent
Chen et al.

(10) Patent No.: US 7,792,150 B2
(45) Date of Patent: Sep. 7, 2010

(54) METHODS, SYSTEMS, AND COMPUTER PROGRAM PRODUCTS FOR SUPPORTING TRANSCODER-FREE OPERATION IN MEDIA GATEWAY

(75) Inventors: Weisheng Chen, Allen, TX (US); Eric C. Chang, Plano, TX (US)

(73) Assignee: Genband US LLC, Plano, TX (US)

( * ) Notice: Subject to any disclaimer, the term of this patent is extended or adjusted under 35 U.S.C. 154(b) by 1012 days.

(21) Appl. No.: 11/207,572

(22) Filed: Aug. 19, 2005

(65) Prior Publication Data

US 2007/0041320 A1    Feb. 22, 2007

(51) Int. Cl.
H04J 3/18    (2006.01)
(52) U.S. Cl. .................................... 370/477; 370/401
(58) Field of Classification Search .................. 370/401, 370/320, 468, 477
See application file for complete search history.

(56) References Cited

U.S. PATENT DOCUMENTS

| | | |
|---|---|---|
| 5,375,121 A | 12/1994 | Nishino et al. |
| 5,710,976 A | 1/1998 | Hill et al. |
| 5,905,873 A | 5/1999 | Hartmann et al. |
| 5,999,529 A | 12/1999 | Bernstein et al. |
| 6,026,086 A | 2/2000 | Lancelot et al. |
| 6,046,999 A | 4/2000 | Miki et al. |
| 6,147,988 A | 11/2000 | Bartholomew et al. |
| 6,339,594 B1 | 1/2002 | Civanlar et al. |
| 6,389,016 B1 | 5/2002 | Sabaa et al. |
| 6,392,993 B1 | 5/2002 | Hamilton et al. |
| 6,424,637 B1 | 7/2002 | Pecen et al. |

(Continued)

FOREIGN PATENT DOCUMENTS

CN    1504039 A    6/2004

(Continued)

OTHER PUBLICATIONS

Commonly-assigned, co-pending U.S. Appl. No. 11/351,339 for "Methods, Systems, And Computer Program Products For Providing Transcoder Free Operation (Trfo) And Interworking Between Unlicensed Mobile Access (Uma) And Universal Mobile Telecommunications System (Umts) Call Legs Using A Media Gateway", (Unpublished, filed Feb. 9, 2006).

(Continued)

*Primary Examiner*—Derrick W Ferris
*Assistant Examiner*—Christopher R Crompton
(74) *Attorney, Agent, or Firm*—Jenkins, Wilson, Taylor & Hunt, P.A.

(57) ABSTRACT

Methods, systems, and computer program products for providing transcoder-free operation in a media gateway are disclosed. In one method, first and second lists of media encoding rates and corresponding indices used by first and second media endpoints of a media stream connection are received. It is determined whether transcoder-free operation is possible for the media stream connection based on the first and second lists. In response to determining that transcoder-free operation is possible for the media stream connection, a transcoder-free connection is established in the media gateway between the first and second endpoints using a single digital signal processor to monitor and map between indices and encoding rates used by the first and second endpoints during the media stream connection.

22 Claims, 8 Drawing Sheets

U.S. PATENT DOCUMENTS

| | | | |
|---|---|---|---|
| 6,549,945 B1 | 4/2003 | Sinibaldi et al. | |
| 6,614,781 B1 | 9/2003 | Elliott et al. | |
| 6,625,169 B1 | 9/2003 | Tofano | |
| 6,647,428 B1 | 11/2003 | Bannai et al. | |
| 6,671,367 B1 | 12/2003 | Graf et al. | |
| 6,693,996 B2 | 2/2004 | Mansfield | |
| 6,731,627 B1 | 5/2004 | Gupta et al. | |
| 6,731,647 B2 | 5/2004 | Yao | |
| 6,765,931 B1 | 7/2004 | Rabenko et al. | |
| 6,795,437 B1 | 9/2004 | Räsänen et al. | |
| 6,845,089 B1 | 1/2005 | Gu et al. | |
| 6,850,778 B1 | 2/2005 | Honkala et al. | |
| 6,850,883 B1 | 2/2005 | Kapanen et al. | |
| 6,865,220 B2 | 3/2005 | Abrishami | |
| 6,898,208 B1 | 5/2005 | Sligo et al. | |
| 6,967,958 B2 | 11/2005 | Ono et al. | |
| 6,967,972 B1 | 11/2005 | Volftsun et al. | |
| 6,973,024 B1 | 12/2005 | Joseph et al. | |
| 6,983,163 B2 | 1/2006 | Sato et al. | |
| 6,990,340 B2 | 1/2006 | Tamura et al. | |
| 7,006,489 B2 | 2/2006 | Li et al. | |
| 7,054,318 B2 | 5/2006 | Eneroth et al. | |
| 7,054,320 B1 | 5/2006 | Lee et al. | |
| 7,058,085 B2 | 6/2006 | Earnshaw et al. | |
| 7,068,623 B1 | 6/2006 | Barany et al. | |
| 7,072,358 B2 | 7/2006 | Suvanen | |
| 7,082,143 B1 | 7/2006 | LeBlanc et al. | |
| 7,089,011 B1 | 8/2006 | Mangal | |
| 7,095,733 B1 | 8/2006 | Yarlagadda et al. | |
| 7,103,021 B2 | 9/2006 | Jou | |
| 7,106,701 B2 | 9/2006 | Stümpert et al. | |
| 7,162,024 B2 | 1/2007 | Wah et al. | |
| 7,180,892 B1 | 2/2007 | Tackin | |
| 7,181,209 B2 | 2/2007 | Tamura | |
| 7,203,226 B1 | 4/2007 | Rabipour et al. | |
| 7,245,589 B2 | 7/2007 | Neulist et al. | |
| 7,245,931 B2 | 7/2007 | Wang et al. | |
| 7,304,984 B2 | 12/2007 | Butler et al. | |
| 7,305,229 B2 | 12/2007 | Fox et al. | |
| 7,349,698 B2 | 3/2008 | Gallagher et al. | |
| 7,369,859 B2 | 5/2008 | Gallagher | |
| 7,400,881 B2 | 7/2008 | Kallio | |
| 7,471,655 B2 | 12/2008 | Gallagher et al. | |
| 7,593,415 B2 | 9/2009 | Li et al. | |
| 7,729,346 B2 | 6/2010 | Lee et al. | |
| 2001/0036158 A1 | 11/2001 | Hallenstal et al. | |
| 2002/0001302 A1 | 1/2002 | Pickett | |
| 2002/0013147 A1 | 1/2002 | Fauconnier et al. | |
| 2002/0072364 A1 | 6/2002 | Tamura | |
| 2002/0108029 A1 | 8/2002 | Bunn et al. | |
| 2003/0032440 A1 | 2/2003 | Sato et al. | |
| 2003/0058822 A1 | 3/2003 | Jou | |
| 2003/0112796 A1 | 6/2003 | Kwan | |
| 2003/0123485 A1 | 7/2003 | Yi et al. | |
| 2003/0133423 A1 | 7/2003 | LaDue | |
| 2003/0134653 A1 | 7/2003 | Sarkkinen et al. | |
| 2003/0135784 A1 | 7/2003 | Yamaguchi et al. | |
| 2003/0210659 A1* | 11/2003 | Chu et al. | 370/320 |
| 2004/0008652 A1 | 1/2004 | Tanzella et al. | |
| 2004/0037224 A1 | 2/2004 | Choi et al. | |
| 2004/0047364 A1 | 3/2004 | Briggs et al. | |
| 2004/0073424 A1 | 4/2004 | Geppert et al. | |
| 2004/0090989 A1 | 5/2004 | Kobayashi | |
| 2004/0100914 A1* | 5/2004 | Hellwig et al. | 370/254 |
| 2004/0114588 A1* | 6/2004 | Bhaskaran | 370/389 |
| 2004/0114922 A1 | 6/2004 | Hardee | |
| 2004/0131025 A1 | 7/2004 | Dohler et al. | |
| 2004/0131051 A1 | 7/2004 | Rabipour et al. | |
| 2004/0196867 A1* | 10/2004 | Ejzak et al. | 370/468 |
| 2004/0208132 A1 | 10/2004 | Neulist et al. | |
| 2004/0252681 A1 | 12/2004 | Rabipour et al. | |
| 2004/0254786 A1 | 12/2004 | Kirla et al. | |
| 2004/0266426 A1 | 12/2004 | Marsh et al. | |
| 2005/0007973 A1 | 1/2005 | Jang et al. | |
| 2005/0013281 A1* | 1/2005 | Milton et al. | 370/349 |
| 2005/0027948 A1 | 2/2005 | Marlan et al. | |
| 2005/0073977 A1 | 4/2005 | Vanghi et al. | |
| 2005/0074017 A1 | 4/2005 | Qian et al. | |
| 2005/0099940 A1 | 5/2005 | Ohenoja et al. | |
| 2005/0105512 A1 | 5/2005 | Myhre et al. | |
| 2005/0157823 A1* | 7/2005 | Sudhakar | 375/341 |
| 2005/0185604 A1 | 8/2005 | Agarwal | |
| 2005/0195829 A1 | 9/2005 | Ward | |
| 2005/0232232 A1 | 10/2005 | Farber et al. | |
| 2005/0265279 A1 | 12/2005 | Markovic et al. | |
| 2005/0267746 A1 | 12/2005 | Jelinek et al. | |
| 2005/0286466 A1 | 12/2005 | Tagg et al. | |
| 2006/0050664 A1 | 3/2006 | Guey | |
| 2006/0062225 A1 | 3/2006 | Li et al. | |
| 2006/0067221 A1 | 3/2006 | Lee et al. | |
| 2006/0092927 A1 | 5/2006 | Li et al. | |
| 2006/0154686 A1 | 7/2006 | Sarkkinen et al. | |
| 2006/0193289 A1 | 8/2006 | Ronneke et al. | |
| 2006/0198347 A1 | 9/2006 | Hurtta et al. | |
| 2006/0229068 A1 | 10/2006 | Niemela et al. | |
| 2006/0268845 A1 | 11/2006 | He et al. | |
| 2006/0268888 A1 | 11/2006 | Liu et al. | |
| 2006/0286981 A1 | 12/2006 | Suumaki et al. | |
| 2006/0291454 A1 | 12/2006 | Ali | |
| 2006/0291483 A1 | 12/2006 | Sela | |
| 2007/0011727 A1 | 1/2007 | Mielenz et al. | |
| 2007/0041360 A1 | 2/2007 | Gallagher et al. | |
| 2007/0043558 A1 | 2/2007 | Schwarz et al. | |
| 2007/0123196 A1 | 5/2007 | Tamura | |
| 2007/0127357 A1* | 6/2007 | Tamura | 370/202 |
| 2007/0127436 A1 | 6/2007 | Karimi-Cherkandi et al. | |
| 2007/0135165 A1 | 6/2007 | Junghanns et al. | |
| 2007/0140214 A1 | 6/2007 | Zoltan | |
| 2007/0140293 A1 | 6/2007 | Agarwal et al. | |
| 2007/0165636 A1 | 7/2007 | He et al. | |
| 2007/0171841 A1 | 7/2007 | Witzel et al. | |
| 2007/0186002 A1 | 8/2007 | Campbell et al. | |
| 2007/0286082 A1 | 12/2007 | Hikspoors et al. | |
| 2008/0039087 A1 | 2/2008 | Gallagher et al. | |
| 2008/0102794 A1 | 5/2008 | Keevill et al. | |
| 2008/0123596 A1 | 5/2008 | Gallagher et al. | |
| 2008/0151845 A1 | 6/2008 | Jaakkola et al. | |
| 2008/0225765 A1 | 9/2008 | Marinier et al. | |
| 2008/0293416 A1 | 11/2008 | Yi et al. | |
| 2008/0316980 A1 | 12/2008 | Ahlen et al. | |

FOREIGN PATENT DOCUMENTS

| | | |
|---|---|---|
| CN | 101341730 A | 1/2009 |
| CN | 02808634.1 | 4/2009 |
| EP | 1 017 217 A2 | 7/2000 |
| EP | 1 364 499 B1 | 7/2009 |
| GB | 2363295 | 12/2001 |
| GB | 2 389 486 A | 12/2003 |
| WO | WO 99/291326 | 6/1999 |
| WO | WO 99/40569 | 8/1999 |
| WO | WO 02/069588 A2 | 9/2002 |
| WO | WO 02/069588 A3 | 9/2002 |
| WO | WO 03/043299 A1 | 5/2003 |
| WO | WO 03/103313 A1 | 12/2003 |
| WO | WO 2005/050960 A1 | 6/2005 |
| WO | WO 2007/022461 A2 | 2/2007 |
| WO | WO 2007/084417 A2 | 7/2007 |

OTHER PUBLICATIONS

"Third Generation Partnership Project; Technical Specification Group Core Network and Terminals; Interworking Between the IP Multimedia (IM) Core Network (CN) Subsystem and Circuit Switched (CS) Networks (Release 6)" 3GPP TS 29.163, pp. 1-128 (Jun. 2005).

Agilent Technologies, "UMTS Network and Service Assurance," International Engineering Consortium, http://www.iec.org/online/tutorials/agilent_umts_network/topic03.html, pp. 1-4 (Copyright 2005).

Sjoberg et al., "Real-Time Transport Protocol (RTP) Payload Format and File Storage Format for the Adaptive Multi-Rate (AMR) and Adaptive Multi-Rate Wideband (AMR-WB) Audio Codecs," Network Working Group, http://www.apps.ietf.org/rfc/rfc3267.html, pp. 1-48 (Jun. 2002).

"Digital Cellular Telecommunications System Phase (2+); Universal Mobile Telecommunications System (UMTS); AMR Speech Codec, Wideband; Interface to Iu and Uu (3GPP TS 26.202 version 6.0.0 Release 6)," Global System for Mobile Communications, ETSI TS 126 202, pp. 1-14 (Dec. 2004).

"Third Generation Partnership Project," Meeting Report v3.0.0, 3GPP TSG-TrFO Workshop#04, pp. 1-18 (Oct. 17-19, 2000).

Notification of Transmittal of the International Search Report and the Written Opinion of the International Searching Authority, or the Declaration for International Application No. PCT/US06/32484 (May 7, 2007).

Notification of Transmittal of the International Search Report and the Written Opinion of the International Searching Authority, or the Declaration for International Application No. PCT/US07/00942 (Oct. 12, 2007).

Commonly-assigned co-pending U.S. Appl. No. 12/535,655 for "Methods, Systems, and Computer Readable Media for Intelligent Optimization of Digital Signal Processor (DSP) Resource Utilization in a Media Gateway", (Unpublished, filed Aug. 4, 2009).

Official Action for U.S. Appl. No. 11/121,626 (May 18, 2009).

Notice of Allowance and Fee(s) Due for U.S. Appl. No. 11/297,941 (May 15, 2009).

Final Official Action for U.S. Appl. No. 11/230,029 (May 14, 2009).

Final Official Action for U.S. Appl. No. 11/297,941 (Jan. 22, 2009).

Communication under Rule 71(3) EPC for European Patent Application No. 02 709 657.7 (Jan. 9, 2009).

Notice of Grant of Patent Right for Invention for Chinese Patent Application No. 02808634.1 (Dec. 26, 2008).

Final Official Action for U.S. Appl. No. 11/121,626 (Nov. 13, 2008).

Official Action for U.S. Appl. No. 11/230,029 (Oct. 29, 2008).

Official Action for Chinese Patent Application No. 02808634.1 (Jun. 20, 2008).

Official Action for U.S. Appl. No. 11/297,941 (May 1, 2008).

Communication pursuant to Rules 161 and 162 EPC for European application No. 06813571.4 (Mar. 28, 2008).

Official Action for U.S. Appl. No. 11/121,626 (Feb. 20, 2008).

International Search Report for International Application No. PCT/US2006/028549 (Dec. 11, 2006).

Communication pursuant to Article 96(2) EPC for European Application No. 02709657 (Jan. 23, 2006).

Notice of Allowance and Fee(s) Due for U.S. Appl. No. 09/792,265 (Sep. 16, 2005).

Final Official Action for U.S. Appl. No. 09/792,265 (Jun. 15, 2005).

Official Action for U.S. Appl. No. 09/792,265 (Oct. 4, 2004).

Notification of Transmittal of International Preliminary Examination Report for International Application No. PCT/US02/05410 (Dec. 5, 2003).

Written Opinion for International Application No. PCT/US02/05410 (Jun. 13, 2003).

Notification of Transmittal of the International Search Report or the Declaration for PCT/US02/05410 (Dec. 27, 2002).

Laurence, M. et al., "Voice Over ATM: A Hybrid TDM/ATM Design Approach," electronic Engineering, Morgan-Grampian Ltd., vol. 71, No. 869, Jun. 1999, pp. 81-82, 84, and 86.

Singer, Josef et al., "Narrow band Services Over ATM Networks: Evaluation of Trunking Methods," World Telecommunications Congress, vol. 2, Sep. 21, 1997, pp. 17-25.

Interview Summary for U.S. Appl. No. 11/121,626 (Oct. 15, 2009).

Official Action for U.S. Appl. No. 11/351,339 (Apr. 1, 2009).

Notice of Allowance and Fee(s) Due for U.S. Appl. No. 11/351,339 (Sep. 26, 2008).

Final Official Action for U.S. Appl. No. 11/351,339 (Mar. 1, 2010).

Final Official Action for U.S. Appl. No. 11/121,626 (Jan. 12, 2010).

Notice of Allowance and Fee(s) Due for U.S. Appl. No. 11/230,029 (Jan. 12, 2010).

R.L. Bunting (Editor), "Transcoder Free Operation," $3^{rd}$ Generation Partnership, Version 1.0, Project 2 (Mar. 18, 2004).

Notice of Allowance and Fee(s) Due for U.S. Appl. No. 11/351,339 (Jun. 25, 2010).

Notice of Allowance and Fee(s) Due for U.S. Appl. No. 11/121,626 (Jun. 24, 2010).

Notice of Allowance and Fee(s) Due for U.S. Appl. No. 11/121,626 (May 27, 2010).

Interview Summary for U.S. Appl. No. 11/121,626 (May 21, 2010).

* cited by examiner

METHODS, SYSTEMS, AND COMPUTER PROGRAM PRODUCTS FOR SUPPORTING TRANSCODER-FREE OPERATION IN MEDIA GATEWAY

TECHNICAL FIELD

The subject matter described herein relates to implementing transcoder-free operation in a telecommunications network. More particularly, the subject matter described herein relates to methods, systems, and computer program products for implementing transcoder-free operation in a media gateway.

BACKGROUND ART

In telecommunications networks, codecs are devices that encode and decode voice signals transmitted over the network. Conventionally, uniform pulse code modulation (PCM) was used to encode voice sent over the telecommunications network. Uniform PCM involves sampling voice signals at a rate of 8,000 samples per second and 8 bits per sample, resulting in a 64 kbps codec rate. More recently, in mobile communications networks, adaptive modulation rate (AMR) codecs have been developed in which encoding and decoding rates change during a call. AMR is used to reduce the bandwidth used by voice calls.

One problem associated with using AMR codecs or other different types of codecs is that transcoding may be required when the source and destination devices use incompatible codecs. Transcoding is a process by which a voice signal encoded according to one rate and encoding standard is converted to another rate and another encoding standard. One problem with performing transcoding is that it can introduce latency and degradation in the voice signal being transmitted.

FIG. 1 is a block diagram illustrating transcoders performing transcoding of a speech signal in a telecommunications network. Referring to FIG. 1, a first transcoder 100 receives an AMR voice signal at an IuUP or NbUP interface of a 3GPP UMTS network. Transcoder 100 performs a transcoding operation by which the AMR voice signal is converted to PCM and forwards the signal to transcoder 102. Transcoder 100 introduces latency and voice degradation into the signal. The latency and voice degradation introduced by transcoder 100 is indicated by $T_1$ in FIG. 1.

Transcoder 102 receives the PCM signal from transcoder 100 and performs a second transcoding operation, converting the PCM signal to AMR rate 1, the same AMR rate received by the first transcoder. Transcoder 102 introduces further latency and voice quality degradation into the signal. The latency and voice quality degradation introduced by transcoder 102 is indicated by $T_2$ in FIG. 1. In the example illustrated in FIG. 1, because the ingress and egress AMR rates are equal, transcoding is unnecessary. However, transcoding is performed because no intelligence exists in the network illustrated in this example to eliminate transcoding.

In order to avoid the difficulties associated with transcoding, methods for transcoder-free operation have been developed. Transcoder-free operation refers to operation in which a connection that is established between telecommunications endpoints, such as mobile telephones, that have compatible codecs where the connection does not use transcoders. FIG. 2 is a block diagram of a conventional transcoder-free operation implementation developed by the assignee of the present application for use in a media gateway, referred to as the SanteraOne™ media gateway. Referring to FIG. 2, media gateway 200 includes a plurality of packet network interfaces 202 for interfacing with voice over IP devices, such as mobile phones 204, an ATM switching fabric 206, voice servers 208, a TDM matrix 210, and TDM network interfaces 212. ATM switching fabric 206 establishes connections between packet network interfaces 202 and voice servers 208. Voice servers 208 perform voice processing functions, such as transcoding, encoding, and decoding. In the illustrated example, each voice server 208 includes a DSP 214 that implements a codec function. TDM matrix 210 switches TDM channels between TDM network interfaces 212 and voice servers 208. TDM matrix 210 also includes an HDLC bus 216 that interconnects DSPs on different voice servers. TDM network interfaces 212 interface with TDM based telecommunications endpoints.

In the example illustrated in FIG. 2, in order to implement a transcoder-free connection, two codecs and two HDLC channels are used. That is, one DSP 214 on voice server 108 monitors the rate of an encoder used by a first telecommunications endpoint and the other DSP 214 on a separate voice server card monitors the encoding rate being used by the other endpoint. Rates and rate changes are communicated between the codecs using the HDLC connections. No transcoding is performed by either voice server because the ingress and egress codec rates are the same.

One problem associated with the transcoder-free operation of the media gateway 200 illustrated in FIG. 2 it requires separate DPSs to monitor each endpoint of the connection Another problem is that the DSPs must be interconnected using two HDLC connections. Establishing each HDLC connection requires complex connection establishment procedures.

Thus, in light of these difficulties associated with providing transcoder-free operation in media gateway, there exists a need for improve methods, systems, and computer program products for providing transcoder-free operation in a media gateway.

SUMMARY

According to one aspect, the subject matter described herein includes a method for implementing transcoder-free operation in a media gateway. The method includes receiving lists of media encoding rates and corresponding indices used by first and second endpoints of a media stream connection. Next, it is determined whether transcoder-free operation is possible for the media stream connection. In response to determining that transcoder-free operation is possible, a transcoder-free connection is established in the media gateway between the first and second endpoints using a single digital signal processor to monitor and map between indices and encoding rates used by the first and second endpoints during the media stream connection.

According to another aspect, a method for implementing transcoder-free operation in a media gateway includes receiving first and second lists of media encoding rates and corresponding indices used by first and second media endpoints of a media stream connection. Next, it is determined whether transcoder-free operation is possible. In response to determining that transcoder-free operation is possible, a transcoder-free connection is established in the media gateway over an Ethernet switching fabric.

The subject matter described herein may be implemented using a computer program product comprising computer executable instructions embodied in a computer readable medium. Exemplary computer readable media suitable for implementing the subject matter described herein include chip memory devices, disc memory devices, application specific integrated circuits, programmable logic devices, and downloadable electrical signals. In addition, a computer program product that implements a subject matter described herein may reside on a single device or computing platform or maybe distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 3:
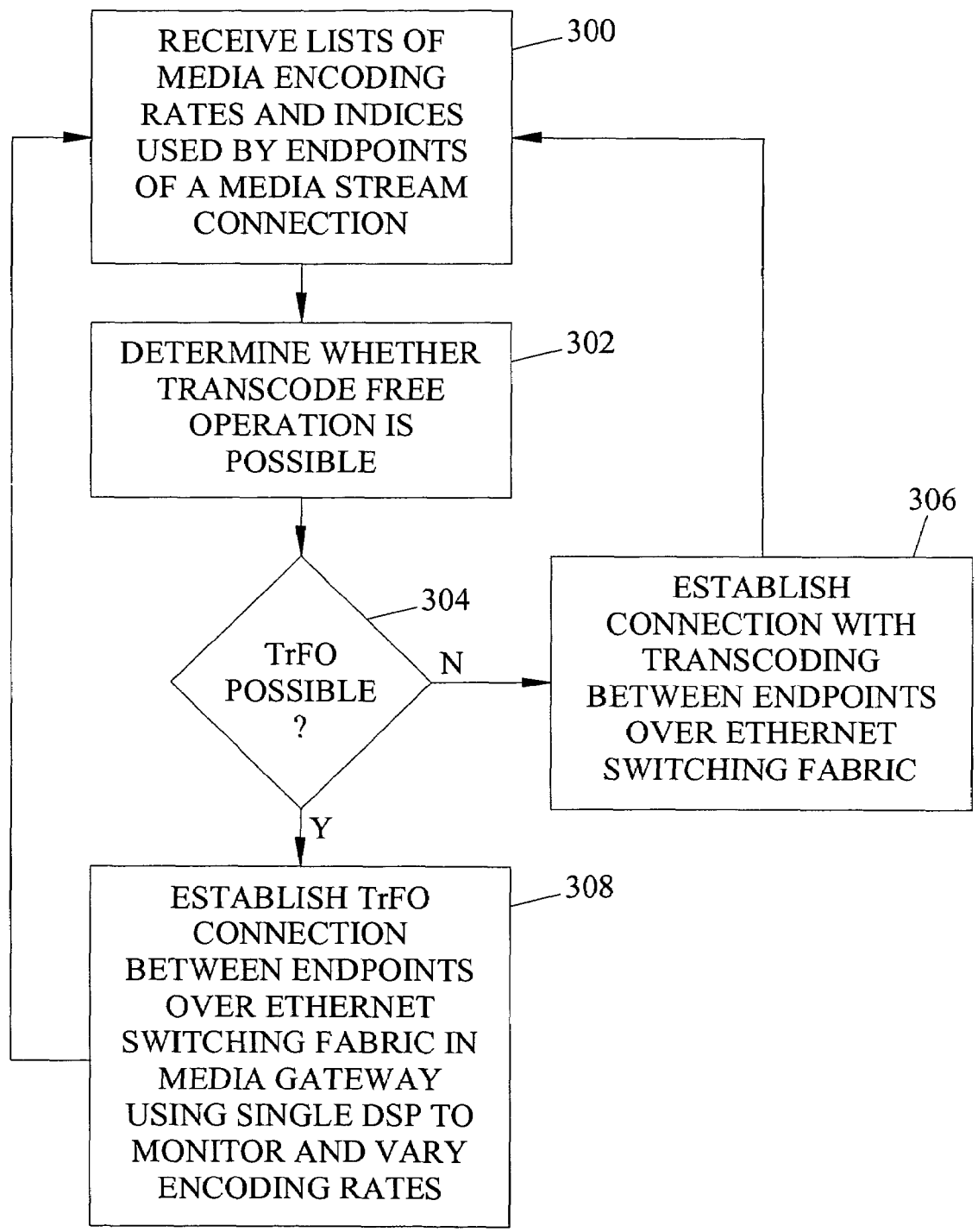
FIG. 3 is a flow chart illustrating a method for implementing transcoder-free operation in a media gateway according to an embodiment of the subject matter described herein.

According to one aspect, the subject matter described herein includes a method for implementing transcoder-free operation in a media gateway. FIG. 3 is a flow chart illustrating the exemplary steps for implementing transcoder-free operation in a media gateway according to an embodiment of the subject matter described herein. Referring to FIG. 3, in step 300, lists of media encoding rates and corresponding indices used by endpoints of a media stream connection are received. These lists may be received by the control module of the media gateway. The control module may forward the lists to an internal processor associated with controlling voice processing functions of the media gateway. In step 302, the internal processor determines whether transcoder-free operation is possible. Determining whether transcoder-free operation is possible may include examining ingress and egress codec rates to determine whether the rates are compatible.

In step 304, if it is determined that transcoder-free operation is not possible, control proceeds to step 306 where a connection with transcoding is established between endpoints over an Ethernet switching fabric. In step 304, if it is determined that transcoder-free operation is possible, control proceeds to step 308 where a transcoder-free operation connection is established between endpoints over the Ethernet switching fabric in a media gateway using a single DSP to monitor and vary encoding rates.

Figure 1:
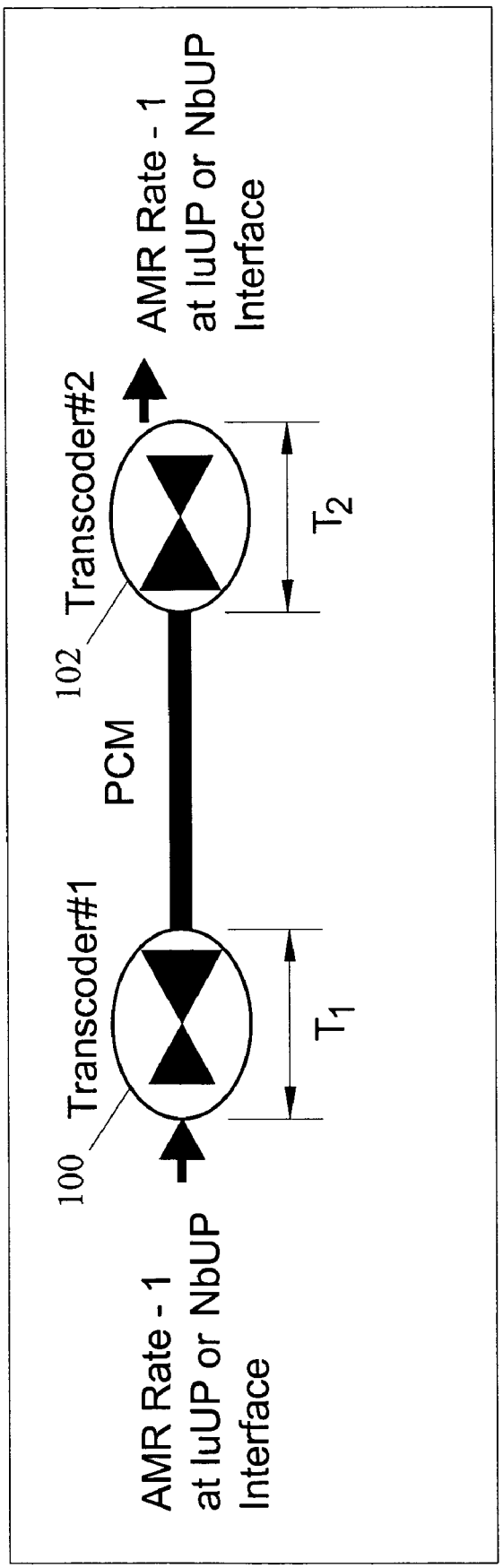
FIG. 1 is a block diagram illustrating transcoding in a telecommunications network.
Figure 2:
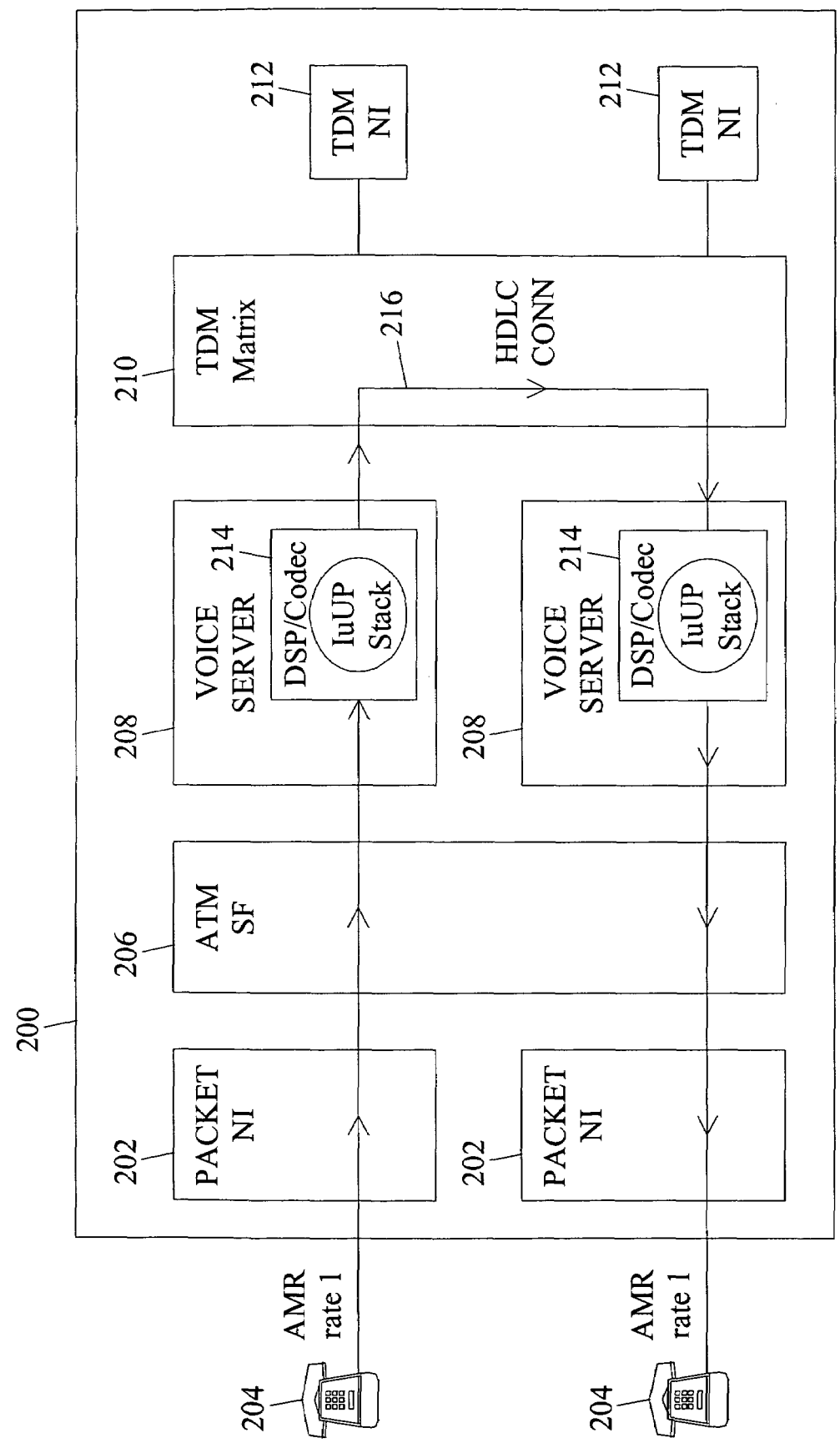
FIG. 2 is a block diagram illustrating a conventional transcoder-free operation implementation in a media gateway.
Figure 4:
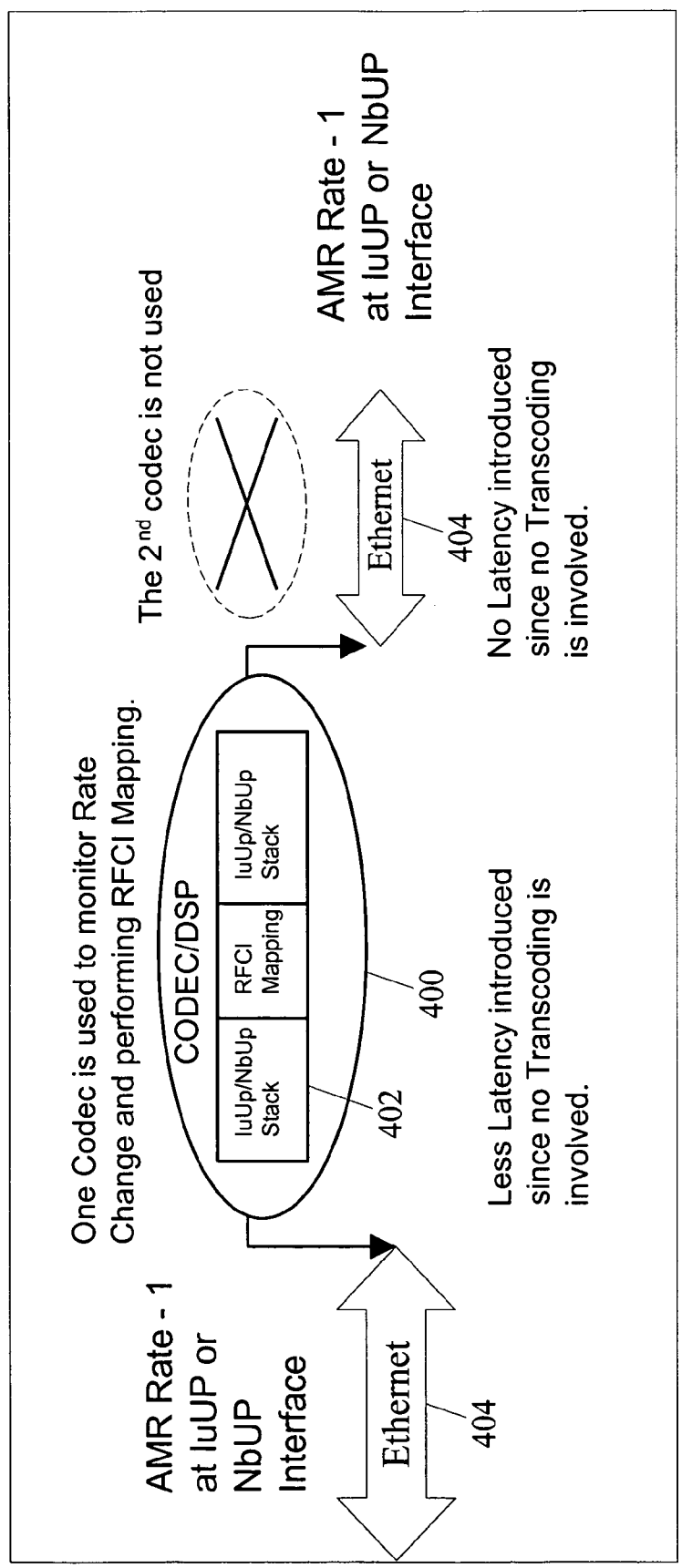
FIG. 4 is a block diagram illustrating exemplary components for implementing transcoder-free operation in a media gateway according to an embodiment of the subject matter described herein.

FIG. 4 is a block diagram illustrating exemplary components for providing transcoder-free operation in a media gateway according to an embodiment of the subject matter described herein. Referring to FIG. 4, a codec/DSP 400 implements a dual IuUP/NbUP protocol stack 402 and performs radio access bearer sub-flow combination indicator (RFCI) mapping for a transcoder-free operation connection. A single DSP 400 is used to implement the transcoder-free operation. A second codec, such as that illustrated in FIG. 2, is not utilized. As a result, the solution illustrated in FIG. 4 reduces the resources required to implement transcoder-free operation in a media gateway. In addition, connections between the endpoints and codec 400 are established over an Ethernet switching fabric, schematically illustrated in FIG. 4 by dual arrows 404.

Figure 5:
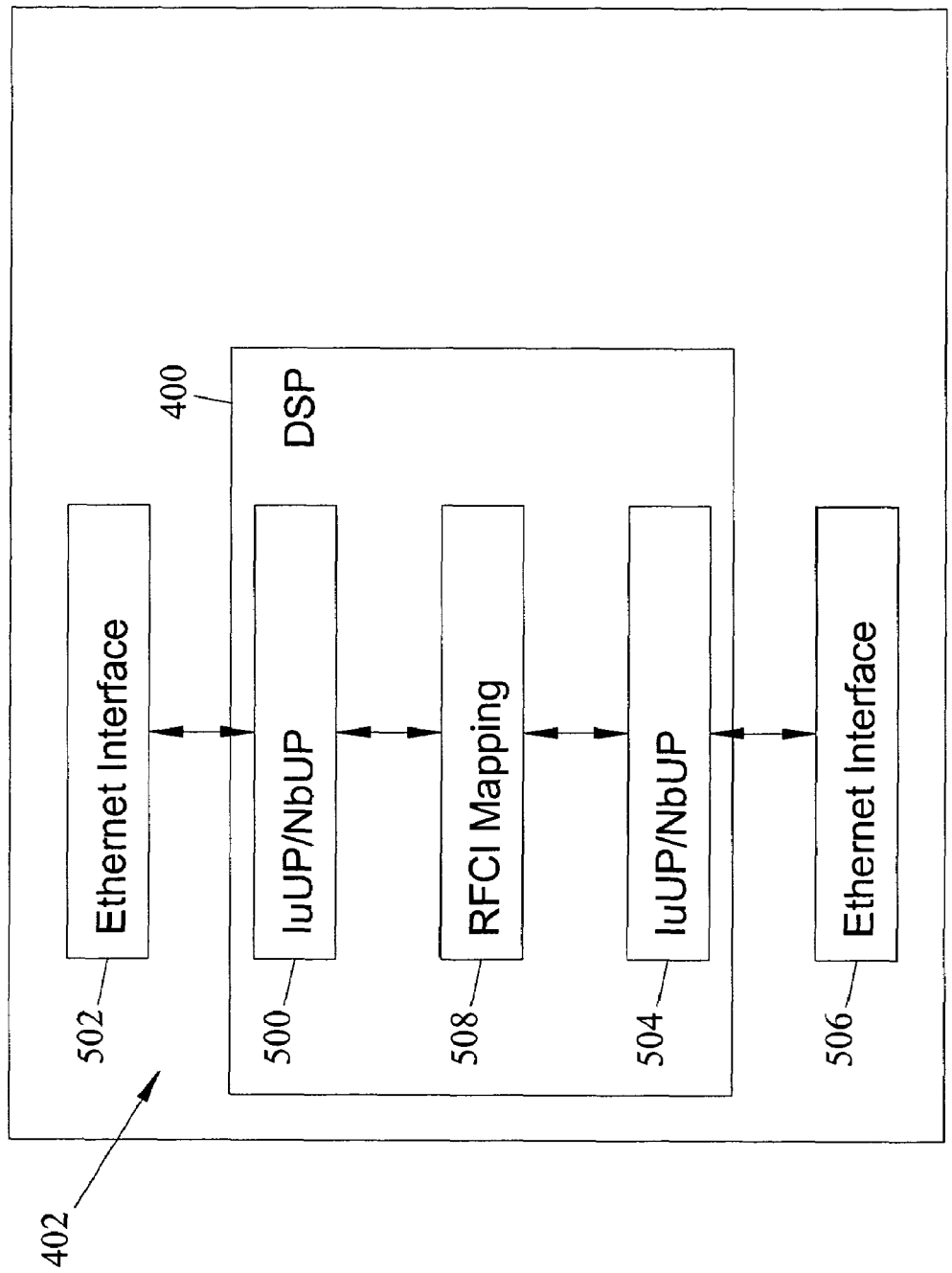
FIG. 5 is a block diagram illustrating an exemplary transcoder-free operation (TrFO) over Ethernet protocol stack that may be implemented in a media gateway according to an embodiment of the subject matter described herein.

FIG. 5 is a block diagram illustrating protocol stack 402 in more detail. In FIG. 5, protocol stack 402 includes a first IuUP/NbUP layer 500 and a first Ethernet interface layer 502 for interfacing with one endpoint of a TrFO connection. In addition, protocol stack 402 includes a second IuUP/NbUP layer 504 and second Ethernet interface layer 506 for interfacing with the other endpoint of a TrFO connection. An RFCI mapping layer 508 maps between codec rates used by the different endpoints of a TrFO connection. It should be noted that layers 500, 504, and 508 may be implemented by a DSP. It should be noted from FIG. 5 that a single DSP 400 is used to implement the IuUP/NbUP layers for each endpoint of a connection as well as to perform the RFCI mapping. Ethernet interface layers 502 and 506 may be implemented a an Ethernet interface that connects the DSP to an Ethernet switching fabric. Using a single DSP to perform AMR rate monitoring and RFCI mapping reduces the resources required to implement TrFO in a media gateway over the implementation illustrated in FIG. 2.

Figure 6:
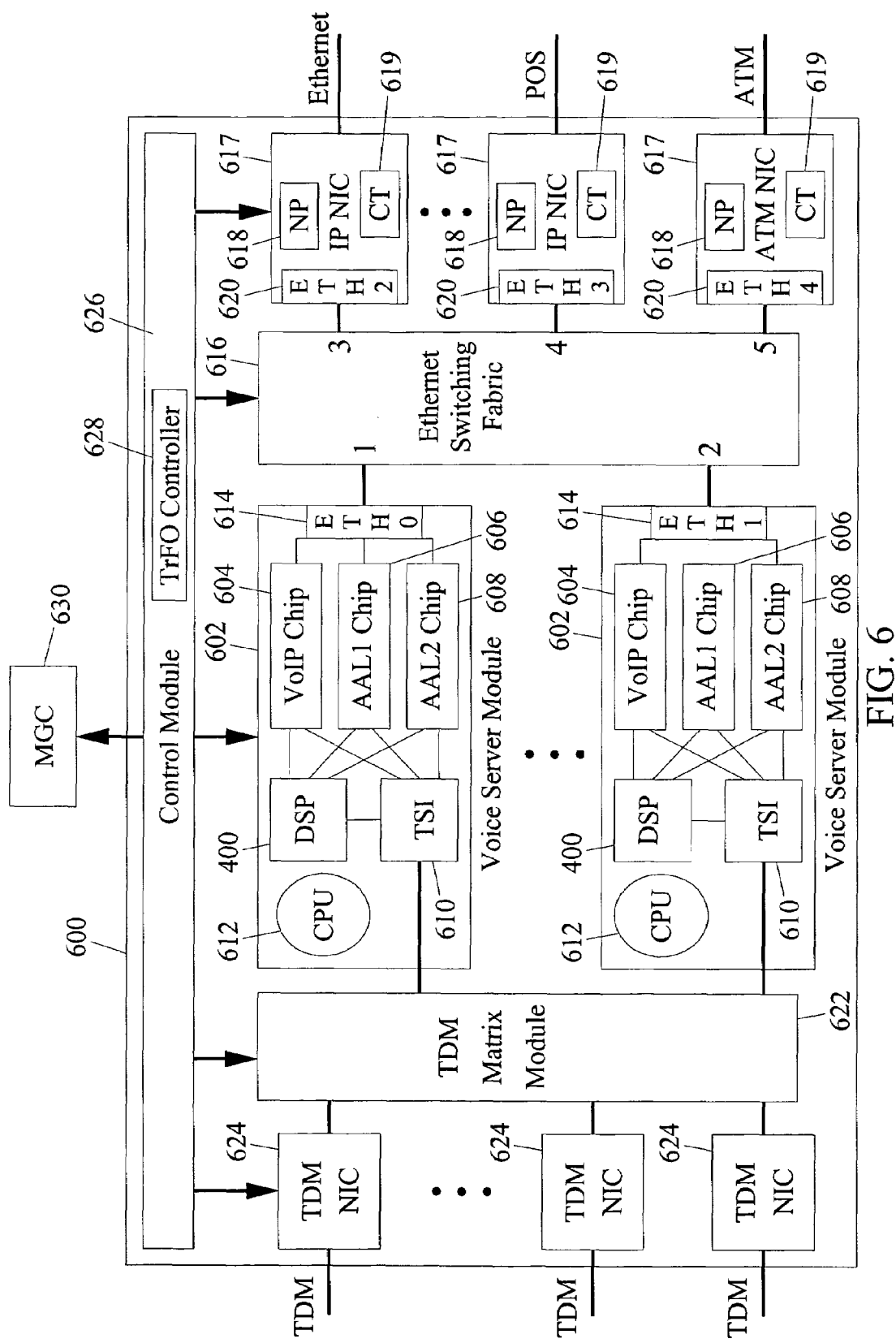
FIG. 6 is a block diagram of a media gateway including an Ethernet switching fabric for implementing transcoder-free operation according to an embodiment of the subject matter described herein.

FIG. 6 is a block diagram illustrating a media gateway for implementing transcoder-free operation according to an embodiment of the subject matter described herein. The architecture illustrated in FIG. 6 corresponds to a media gateway having an Ethernet switching fabric, as described in commonly-assigned, co-pending U.S. patent application Ser. No. 11/138,990, filed May 26, 2005, the disclosure of which is incorporated herein by reference in its entirety. Referring to FIG. 6, media gateway 600 includes the plurality of voice servers 602 for performing voice processing functions. In the illustrated example, each voice server 602 includes a voice over IP chip 604, an AAL1 chip 606, an AAL2 chip 608, a time slot interconnection 610, CPU 612, DSP 400, and an Ethernet interface 614. VoIP chip 604 encapsulates and removes voice information from IP packets and forwards the information to DSP 400 for further processing. AAL1 and AAL2 chips 606 and 608 perform ATM adaptation layer one and layer two functions, respectively. DSP 400 performs transcoding, echo-cancellation, and other payload translation functions. According to an aspect of the subject matter described herein, each DSP 400 may implement the dual IuUP/NbUP protocol stack with RFCI mapping described above. TSI 610 makes on demand connections between voice over IP chip channels, TDM matrix channels and DSPs. CPU 612 controls the overall operation of each voice over module 602. Ethernet interfaces 614 connect each voice server module with other modules that are connected to an Ethernet switching fabric 616.

Media gateway 600 also includes broadband network interfaces 617 that connect media gateway to external networks for receiving media packets from the networks. Broadband network interfaces 617 may include IP network interfaces as well as ATM network interfaces. Each broadband network interface 617 may include a network processor 618, a connection table 619, and an internal Ethernet interface 620. Network processors 618 control the overall operation of each broadband network interface 617. For example, network processors 618 may control the writing of data to each connection table 618. Each connection table 619 maintains connection data for forwarding media packets to the correct voice server. Internal Ethernet interfaces 620 connect each broadband network interface 617 to Ethernet switching fabric 616.

Ethernet switching fabric 616 interconnects voice server 602 and broadband interface 617. In the illustrated example, Ethernet switching fabric 616 includes a plurality of ports, numbered one through five. Five ports are shown for illustrative purposes only. It is understood that Ethernet switching fabric 616 may include fewer or more than five ports, depending on the number of devices connected to Ethernet switching fabric 616.

Media gateway 600 also includes a TDM matrix module 622 for switching TDM time slots between TDM network interfaces 624 and voice servers 602. TDM network interfaces 624 connect media gateway 600 to external TDM devices, such as TDM enabled end offices.

A control module 626 controls the overall operation of media gateway 600. In the illustrated example, control module 626 includes a TrFO controller 628 for receiving information from CPUs 612 of each voice server module regarding ingress and egress encoding rates and indices, determining whether TrFO is possible, and instructing voice server module 602 and network interfaces 617 to implement TrFO over Ethernet switching fabric 616. Control module 626 also communicates with an external media gateway controller 630. Media gateway controller 630 controls the establishment of connections by media gateway 600 using a media gateway control protocol, such as MEGACO or MGCP.

Figure 7:
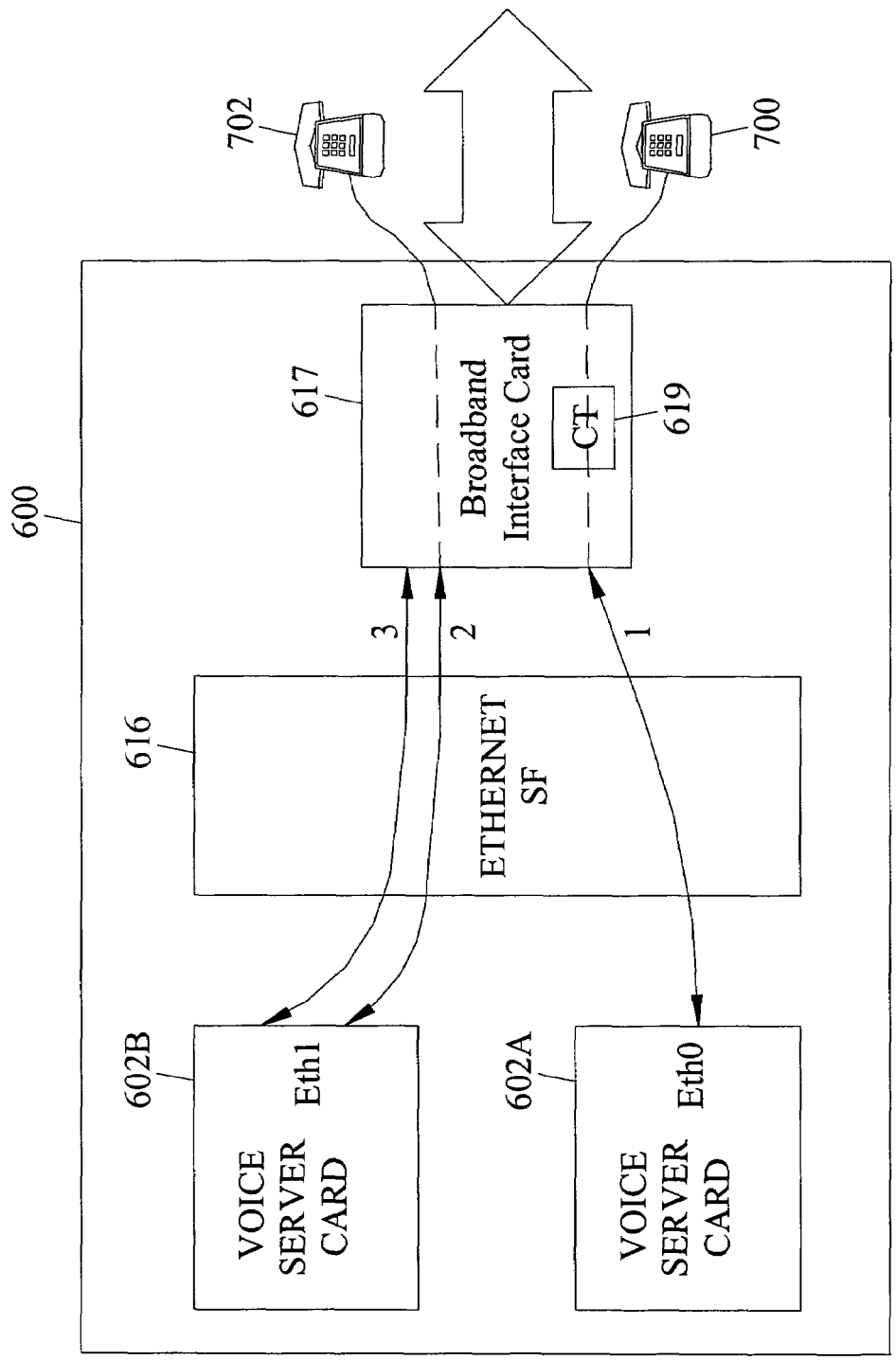
FIG. 7 is a block diagram illustrating an exemplary method for implementing transcoder-free operation in a media gateway according to an embodiment of the subject matter described herein.

FIG. 7 is a block diagram illustrating exemplary steps for achieving TrFO in media gateway 600 according to one embodiment of the subject matter described herein. Referring to FIG. 7, a first media stream connection (labeled 1) is established between a first network endpoint 700 and a first voice server 602A. A second media stream connection (labeled 2) is established between the second endpoint 702 and a second voice server 602B. A third media connection (labeled 3) is established between broadband interface card 617 and voice server card 602B. Once the control module determines a transcoder-free operation is possible, the control module instructs broadband interface card 617 to replace connection 1 with connection 3. Replacing connection 1 with connection 3 may include instructing broadband interface card 617 to update its connection table 619 to reflect the new connection for the call. In addition, replacing connection 1 with connection 3 may include instructing voice server 602B to implement the dual NbUP/IuUP protocol stack and RFCI mapping function described above.

Tables 1 and 2 shown below illustrate the status of connection table 619 of broadband network interface card 617 before and after transcoder free operation is implemented. Tables 1 and 2 each include a first column indicating the external or network VPI/VCI value associated with incoming ATM cells that carry voice. The second column in each table includes a new VPI/VCI value used internally between the voice server cards and the network interfaces. The third column includes the voice server MAC address corresponding to the connection. It can be seen that in Table 1, before transcoder-free operation is established, the connection to each endpoint includes a separate voice server MAC address. In Table 2, after transcoder free operation is implemented, the voice server MAC address corresponding to both endpoints of the connection is Ethernet address ETH1, which corresponds to a single voice server card.

TABLE 1

Broadband Interface Connection Table Before TrFO

| External VPI/VCI | New VPI/VCI | Voice Server MAC Addr. |
|---|---|---|
| 100/1 | 110/1 | Eth 0 |
| 100/2 | 110/2 | Eth 1 |

TABLE 2

Broadband Interface Connection Table After TrFO

| External VPI/VCI | New VPI/VCI | Voice Server MAC Addr. |
|---|---|---|
| 100/1 | 110/3 | Eth 1 |
| 100/2 | 110/2 | Eth 1 |

An important function performed by a DSP once a TrFO connection is established is RFCI mapping. In order to perform such mapping, the DSP may maintain separate RFCI values for each connection endpoint. Tables 3 and 4 shown below are examples of RFI values that may be maintained by a DSP on a voice server card according to an embodiment of the subject matter described herein.

TABLE 3

RFCI Values and Rates for Endpoint A

| Channel Index | Rate |
|---|---|
| 1 | 12.2k |
| 2 | 10.2k |
| 3 | 7.95k |
| 4 | 6.7k |

TABLE 3

RFCI Values and Rates for Endpoint B

| Channel Index | Rate |
|---|---|
| 5 | 12.2k |
| 6 | 10.2k |
| 7 | 7.95k |
| 8 | 6.7k |

From Tables 1 and 2, the channel index and the corresponding rates for each endpoint can be determined. Once the DSP knows the indices and corresponding rates, the DSP can perform mappings between indices used by different endpoints. In the examples illustrated in Tables 3 and 4, the mappings would be 1-5, 2-6, 3-7, and 4-8.

Figure 8:
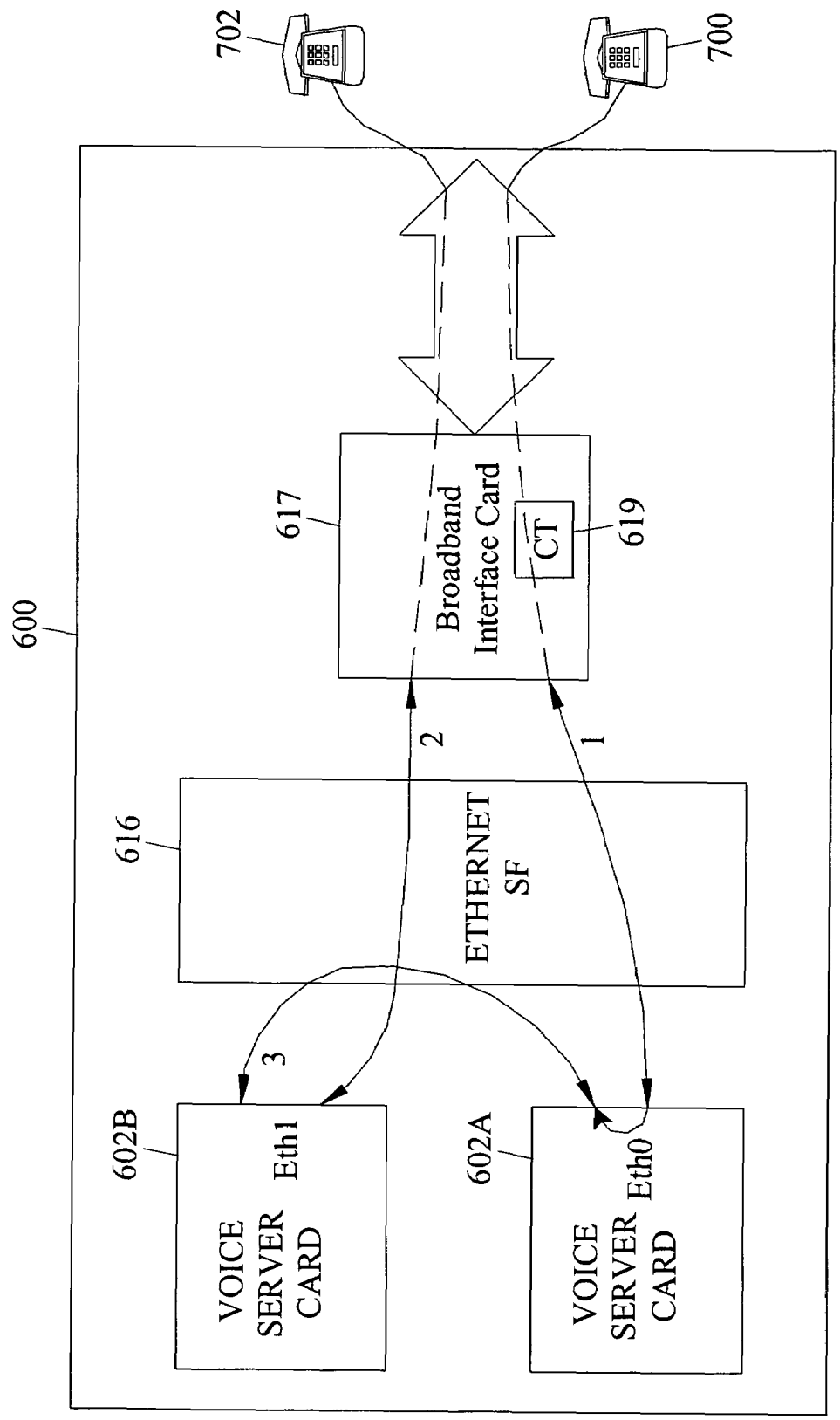
FIG. 8 is a block diagram illustrating an alternate method for implementing transcoder-free operation in a media gateway according to an embodiment of the subject matter described herein.

FIG. 8 is a block diagram illustrating an alternate method for implementing TrFO in a media gateway according to an embodiment of the subject matter described herein. Referring to FIG. 8, a first media stream connection (labeled 1) is established between endpoint 700 and voice server 602A. A second media connection (labeled 2) is established between endpoints 702 and voice server 602B. Once TrFO controller 628 (illustrated in FIG. 6) that determines transcoder-free operation is possible, TrFO controller 628 instructs voice server 602A to perform a loop back function and to initiate a connection (labeled 3) with voice server 602B. Implementing a loop back connection at voice server 602A means that the DSP on voice server 602A is not impacted. Thus, even though the solution illustrated in FIG. 8 requires two voice servers, DSP processing resources are conserved over conventional TrFO implementations in media gateway, because DSP resources on the voice server where the loop back is implemented are not used.

Thus, the subject matter described herein includes methods, systems, and computer program products for implementing TrFO in media gateway. The subject matter includes utilizing a single DSP that implements a dual IbUP/NbUP protocol stack and RFCI mapping for both ends of a TrFO connection. In addition, the TrFO connection is established over an Ethernet switching fabric. Because only a single DSP is required, DSP processing resources are conserved over conventional TrFO implementations. Because an Ethernet switching fabric is used instead of an ATM switching fabric, the cost and complexity of the media gateway are reduced.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for implementing transcoder-free operation in a media gateway, the method comprising:
    (a) receiving first and second lists of adaptive modulation rate (AMR) media encoding rates and corresponding radio access bearer sub-flow combination indicator (RFCI) values used by first and second media endpoints of a media stream connection;
    (b) determining whether transcoder-free operation is possible for the media stream connection based on the first and second lists; and
    (c) in response to determining that transcoder-free operation is possible for the media stream connection, establishing and maintaining a transcoder-free connection in the media gateway between the first and second endpoints using a single digital signal processor (DSP) to monitor and map between the RFCI values used by the first and second endpoints to identify different AMR media encoding rates as the AMR media encoding rates change during and after establishing the media stream connection.

2. The method of claim 1 wherein receiving first and second lists of media encoding rates and corresponding indices includes receiving first and second lists of the RFCI values and corresponding media encoding rates used by the first and second endpoints.

3. The method of claim 1 wherein determining whether transcoder-free operation is possible includes determining whether the media encoding rates in the first list are compatible with those in the second list.

4. The method of claim 1 wherein establishing a transcoder-free connection includes establishing a first connection between the first endpoint and a first voice server, establishing a second connection between the second endpoint and a second voice server, and replacing the second connection with a third connection between the second endpoint and the first voice server.

5. The method of claim 1 wherein establishing a transcoder-free connection includes establishing a first connection between the first endpoint and a first voice server, establishing a second connection between the second endpoint and a second voice server, and establishing a loop back connection between the first and second voice server.

6. The method of claim 1 wherein establishing a transcoder-free connection includes establishing a transcoder-free connection over an Ethernet switching fabric in the media gateway.

7. The method of claim 1 comprising, after establishing the transcoder-free connection, performing radio access bearer sub-flow combination indicator (RFCI) mapping for the connection.

8. A method for implementing transcoder-free operation in a media gateway, the method comprising:
    (a) receiving first and second lists of adaptive modulation rate (AMR) media encoding rates and corresponding indices used by first and second media endpoints of a media stream connection;
    (b) determining whether transcoder-free operation is possible for the media stream connection based on the first and second lists; and
    (c) in response to determining that transcoder-free operation is possible, establishing and maintaining a transcoder-free connection over an Ethernet switching fabric in the media gateway by monitoring and mapping between radio access bearer sub-flow combination indicators (RFCI) values used by the first and second end parts to identify different AMR encoding rates as the AMR media encoding rates change during and after establishing the media stream connection.

9. The method of claim 8 wherein receiving first and second lists of media encoding rates and corresponding indices includes receiving first and second lists of the RFCI values and corresponding media encoding rates used by the first and second endpoints.

10. The method of claim 8 wherein determining whether transcoder-free operation is possible includes determining whether the media encoding rates in the first list are compatible with those in the second list.

11. The method of claim 8 wherein establishing a transcoder-free connection includes establishing a first connection between the first endpoint and a first voice server, establishing a second connection between the second endpoint and a second voice server, and replacing the second connection with a third connection between the second endpoint and the first voice server.

12. The method of claim 8 wherein establishing a transcoder-free connection includes establishing a first connection between the first endpoint and a first voice server, establishing a second connection between the second endpoint and a second voice server, and establishing a loop back connection between the first and second voice servers.

13. The method of claim 8 comprising, after establishing the transcoder-free connection, performing radio access bearer sub-flow combination indicator (RFCI) mapping for the connection.

14. A media gateway comprising:
    (a) a broadband interface for sending media packets to and receiving media packets from an external network;
    (b) a packet switching fabric for forwarding media packets between the broadband interface and at least one internal processing resource in the media gateway;
    (c) at least one voice server for performing voice processing functions, including transcoding, for the media packets; and
    (d) a transcoder-free operation controller for establishing a transcoder-free connection between the broadband interface and the voice server via the switching fabric, wherein the at least one voice server includes a digital signal processor (DSP) that monitors and maps between radio access bearer sub-flow combination indicator (RFCI) values used by endpoints of the connection to identify different adaptive modulation rate (AMR) media encoding rates as the AMR encoding rates change during and after establishing the connection.

15. The media gateway of claim 14 wherein the broadband interface comprises an IP interface.

16. The media gateway of claim 14 wherein the broadband interface comprises an ATM interface.

17. The media gateway of claim 14 wherein the packet switching fabric comprises an Ethernet switching fabric.

18. The media gateway of claim 14 wherein the packet switching fabric comprises an ATM switching fabric.

19. The media gateway of claim 14 wherein the DSP is a single DSP that maintains the transcoder-free connection.

20. The media gateway of claim 14 wherein the transcoder-free operation controller determines whether transcoder-free operation is possible by examining encoding rates used by endpoints of a connection.

21. A non-transitory computer readable medium having stored thereon computer executable instructions that when executed by a processor of a computer perform steps comprising:
   (a) receiving first and second lists of adaptive modulation rate (AMR) media encoding rates and corresponding radio access bearer sub-flow combination indicator (RFCI) values used by first and second media endpoints of a media stream connection;
   (b) determining whether transcoder-free operation is possible for the media stream connection based on the first and second lists; and
   (c) in response to determining that transcoder-free operation is possible for the media stream connection, establishing and maintaining a transcoder-free connection in the media gateway between the first and second endpoints using a single digital signal processor (DSP) to monitor and map between the RFCI values used by the first and second endpoints to identify different AMR media encoding rates as the AMR media encoding rates change during and after establishing the media stream connection.

22. A non-transitory computer readable medium having stored thereon computer executable instructions that when executed by a processor of a computer perform steps comprising:
   (a) receiving first and second lists of adaptive modulation rate (AMR) media encoding rates and corresponding radio access bearer sub-flow combination indicator (RFCI) values used by first and second media endpoints of a media stream connection;
   (b) determining whether transcoder-free operation is possible for the media stream connection based on the first and second lists; and
   (c) in response to determining that transcoder-free operation is possible, establishing and maintaining a transcoder-free connection over an Ethernet switching fabric in the media gateway by mapping between the RFCI values used by the first and second endpoints to identify different AMR media encoding rates as the AMR media encoding rates change during and after establishing the media stream connection.

* * * * *